United States Patent
Brown

(10) Patent No.: US 10,384,442 B2
(45) Date of Patent: Aug. 20, 2019

(54) TWO SIDED PRINTED HEAT SEAL FILM

(71) Applicant: Leading Edge Labels Ltd., Gravesend, Kent (GB)

(72) Inventor: Michael Duncan Brown, Hertford Hertfordshire (GB)

(73) Assignee: Leading Edge Labels Ltd., Gravesend, Kent (GB)

( * ) Notice: Subject to any disclaimer, the term of this patent is extended or adjusted under 35 U.S.C. 154(b) by 116 days.

(21) Appl. No.: 15/519,418

(22) PCT Filed: Oct. 15, 2015

(86) PCT No.: PCT/EP2015/073919
§ 371 (c)(1),
(2) Date: Apr. 14, 2017

(87) PCT Pub. No.: WO2016/059174
PCT Pub. Date: Apr. 21, 2016

(65) Prior Publication Data
US 2017/0239936 A1 Aug. 24, 2017

(30) Foreign Application Priority Data
Oct. 15, 2014 (GB) .................................. 1418289.3

(51) Int. Cl.
*B32B 3/02* (2006.01)
*B41F 19/00* (2006.01)
(Continued)

(52) U.S. Cl.
CPC ............ *B41F 19/001* (2013.01); *B32B 15/00* (2013.01); *B32B 15/04* (2013.01); *B32B 15/08* (2013.01); *B32B 15/20* (2013.01); *B32B 27/06* (2013.01); *B32B 27/08* (2013.01); *B32B 27/30* (2013.01); *B32B 27/304* (2013.01); *B32B 27/32* (2013.01); *B32B 27/36* (2013.01); *B32B 29/00* (2013.01); *B32B 37/02* (2013.01); *B32B 38/145* (2013.01); *B41F 19/00* (2013.01); *B32B 2307/30* (2013.01); *B32B 2307/31* (2013.01); *B32B 2307/40* (2013.01); *B32B 2307/41* (2013.01); *B32B 2307/412* (2013.01); *B32B 2307/546* (2013.01); *B32B 2307/732* (2013.01); *B32B 2307/75* (2013.01); *B32B 2439/00* (2013.01); *B32B 2439/02* (2013.01); *B32B 2439/06* (2013.01);
(Continued)

(58) Field of Classification Search
CPC ......... B32B 15/00; B32B 15/04; B32B 15/08; B32B 15/20; B32B 27/08; B32B 27/32
See application file for complete search history.

(56) References Cited

FOREIGN PATENT DOCUMENTS

DE 102011103000 A1 11/2012
WO 2012142271 A1 10/2012

OTHER PUBLICATIONS

International Search Report and Written Opinion, PCT/EP2015/073919, dated Jan. 22, 2016, 12 pages.

*Primary Examiner* — Elizabeth E Mulvaney
(74) *Attorney, Agent, or Firm* — Nelson Mullins Riley & Scarborough LLP; Anthony A. Laurentano

(57) ABSTRACT

A printing press for printing a heat seal film for packaging comprises at least two receivers, a first printer and a laminator, wherein, in use, a first receiver is capable of receiving a sealing layer and a second receiver is capable of receiving a printing layer, wherein the printer prints onto the sealing layer to provide a printed sealing layer and simultaneously the laminator laminates the printed sealing layer together with the printing layer.

56 Claims, 2 Drawing Sheets

(51) Int. Cl.
*B32B 27/32* (2006.01)
*B32B 27/36* (2006.01)
*B32B 38/00* (2006.01)
*B32B 15/00* (2006.01)
*B32B 15/04* (2006.01)
*B32B 15/20* (2006.01)
*B32B 27/06* (2006.01)
*B32B 27/08* (2006.01)
*B32B 27/30* (2006.01)
*B32B 29/00* (2006.01)
*B32B 37/02* (2006.01)
*B32B 15/08* (2006.01)

(52) U.S. Cl.
CPC ....... *B32B 2439/70* (2013.01); *B32B 2439/80* (2013.01); *B32B 2553/00* (2013.01)

TWO SIDED PRINTED HEAT SEAL FILM

RELATED APPLICATIONS

This application is a 35 U.S.C. 371 national stage filing of International Application PCT/EP2015/073919, filed 15 Oct. 2015, which claims priority to GB 1418289.3 filed on 15 Oct. 2014 in Great Britain. The contents of the aforementioned applications are hereby incorporated by reference.

The present invention relates to a printing press for printing heat seal films for packaging as well as a method for printing of heat seal films for packaging wherein two sides of the film are printed in a single pass through a printing press. The method includes the steps of laminating the film at the time of printing to provide a film having a number of layers, and printing on both sides of a film in a single pass through a printing press.

BACKGROUND OF THE INVENTION

Heat seal films are known to be used in the packaging industry to seal many types of packaging. They are often used to seal plastic trays, or thermo-formed blister packaging. The heat seal film generally comprises a first side having a printed surface facing outwardly from the packaging and a second side having a sealing surface facing inwardly to the packaging.

The sealing surface is generally provided by a sealing layer which when exposed to heat, time and pressure seals to an abutting surface of a tray or blister pack. Alternatively, it is known to ultrasonically weld a film to a tray or blister pack.

Because it is desirable to seal packages, the known films often comprise of a number of discrete layers, with each layer performing a specific function within the film. For example, a first a layer of a film adjacent to a tray will generally be a sealing layer, and one or more other layers may provide a printed layer and/or a protection layer to protect the film during heat sealing.

It is required that some heat seal films appear to be printed/decorated on both sides so that the film has a pleasing appearance. However, in light of the fact that the inner facing surface of the film must provide a heat seal layer, any print or ink applied to the package facing surface of the film has been found to interfere with the sealing process and prevent the film sealing properly.

Until now, this problem has been solved in part by providing a colourless or clear transparent sealing layer which is laminated to a printed layer.

Furthermore, in the event that both sides of the film should appear to be printed so that the inside and outside of the packaging should appear to be printed, this currently requires the printed layer to be printed on both sides and this has required either:
  a) printing the film in two passes through a printing press, each pass to print an opposing side of the film, and then laminating a transparent sealing layer to the printed film in a separate operation; or
  b) printing both sides of the film through a printing press by printing one side of the film, turning it through 180 degrees and feeding it back through the printing press to print an opposing side of the film, and then laminating a transparent sealing layer to the printed film in a separate operation.

Use of the second method mentioned above has been limited, because in the case of many films there are technical difficulties associated with turning the film 180 degrees without causing stretching, creasing or scratching of the film.

In light of these problems, various proposals have been made, but there remains a need for an improved printing press and methods which address one or more of the problems presented by prior art arrangements.

Remarkably, the invention provides a new printing press for printing heat seal films wherein the printing press is capable of printing both sides of a print layer in a single pass through the press and laminating the print layer to a sealing layer to provide a heat seal film printed on both sides. Advantageously, designs printed on first and second sides of the film can be printed in register to each other.

SUMMARY OF THE INVENTION

In accordance with a first aspect of the present invention, there is provided a printing press for printing a heat seal film for packaging, wherein the press comprises at least two receivers, a first printer and a laminator, wherein, in use, a first receiver is capable of receiving a sealing layer and a second receiver is capable of receiving a printing layer, wherein the printer prints onto the sealing layer to provide a printed sealing layer and simultaneously the laminator laminates the printed sealing layer together with the printing layer.

Accordingly, when printing onto a web of material referred to herein as the sealing layer, laminating on a previously printed part of the web is also taking place downstream of the printing at the same time.

Preferably, the printing press comprises a second printer, wherein, in use, the second printer prints onto the printing layer to provide a printed printing layer.

Preferably, the printed surface of the printed sealing layer adjoins a non-printed surface of the printed printing layer and the printed surface of the printed printing layer faces away from the sealing layer so that the laminated heat seal film appears to be printed on opposing sides.

Preferably, the printing press laminates the printed sealing layer onto at least one other layer and the printed sealing layer provides a base of a heat seal film.

Preferably, the sealing layer is transparent. More preferably, it is colourless. Preferably the thickness of this layer is between about 20 µm and about 150 µm. More preferably, it is about 50 µm to about 100 µm. Most preferably, it is about 75 µm.

Preferably, the sealing layer is of a flexible material. Preferably, it is selected from the group consisting of polyethylene terephthalate (otherwise known as PET or polyester), polypropylene, PVC, polyolefin, plastics Film, polythene, pallet wrap and stretch wrap films.

Preferably, the printing press laminates a printing layer onto the printed sealing layer to provide a laminate consisting of a printed sealing layer and a printing layer.

Preferably, the printing layer is opaque. In an embodiment the printing layer is selected from one or more of substantially white, substantially metalised and substantially multi-coloured coloured.

Preferably, the printing layer is of a flexible material. Preferably, it is selected from the group consisting of one or more of polyethylene terephthalate (otherwise known as PET or polyester), polypropylene, polyvinylchloride (PVC), polyolefin, plastics film, polythene, pallet wrap and stretch wrap films, a paper substrate, and a metal foil which is optionally selected from an aluminium or alloy. Preferably, the printing layer is metalised.

In an embodiment, the printing layer is selected from one or more of polyethylene terephthalate (otherwise known as PET or polyester), polypropylene, polyvinylchloride (PVC), polyolefin, plastics film, polythene, pallet wrap and stretch wrap films, which is optionally metalised and preferably the thickness of the printing layer is between about 12 µm and about 50 µm. More preferably, it is about 20 µm to about 40 µm. Most preferably, it is about 30 µm.

In an alternative embodiment, the printing layer is selected from one or more of a paper substrate, which is optionally metalised, and preferably the thickness of the printing layer is up to about 120 µm. More preferably, it is about 90 µm to about 120 µm.

In an alternative embodiment, the printing layer is selected from one or more of a metal foil which is optionally selected from an aluminium or alloy, and preferably the thickness of the printing layer is from about 9 µm to about 15 µm. More preferably, it is about 10 µm to about 14 µm. Most preferably, it is about 12 µm.

Preferably, the printing press prints onto the surface of the laminate provided by the printing layer.

Preferably, the printing press comprises a third receiver for receiving a cover layer and a second laminator, wherein, in use, the printing press laminates the cover layer together with the printed sealing layer and the printed printing layer to provide a laminate wherein the cover layer is provided on the printed surface of the printing layer so that the printed printing layer is sandwiched between the printed sealing layer and the cover layer. Preferably, the cover layer is transparent. More preferably, it is colourless. Preferably the thickness of this layer is between about 12 µm and about 30 µm. More preferably, it is about 15 µm to about 25 µm. Most preferably, it is about 20 µm.

Preferably, the cover layer is of a flexible material. Preferably, it is selected from the group consisting of polyethylene terephthalate (otherwise known as PET or polyester), polypropylene, PVC, polyolefin, plastics Film, polythene, pallet wrap and stretch wrap films.

The resulting heat seal film will give the appearance of a film printed on both sides of the printing layer, encapsulated between the sealing layer and the cover layer, both of which are preferably transparent.

Advantageously, the invention provides the advantage that the heat seal film can be produced in a single pass through the printing press.

In a second aspect, the invention provides a method for printing a heat seal film for packaging, wherein the method comprises the steps of providing a sealing layer and a printing layer, printing onto a first surface of the sealing layer to provide a printed sealing layer and simultaneously laminating the printing layer onto the printed surface of the sealing layer.

Preferably, the method comprises the step of printing onto the surface of the printing layer facing away from the sealing layer.

Preferably, the method comprises the step of laminating a cover layer onto the printed surface of the printing layer.

Preferably, printed surfaces of the sealing layer abuts the printing layer and the printed printing layer faces away from the sealing layer so that the laminated heat seal film appears to be printed on opposing sides.

Preferably, the sealing layer is transparent. More preferably, it is colourless. Preferably the thickness of this layer is between about 20 µm and about 150 µm. More preferably, it is about 50 µm to about 100 µm. Most preferably, it is about 75 µm.

Preferably, the sealing layer is of a flexible material. Preferably, it is selected from the group consisting of polyethylene terephthalate (otherwise known as PET or polyester), polypropylene, PVC, polyolefin, plastics Film, polythene, pallet wrap and stretch wrap films.

Preferably, the printing layer is opaque. In an embodiment the printing layer is selected from one or more of substantially white, substantially metalised and substantially multicoloured coloured.

Preferably, the printing layer is of a flexible material. Preferably, it is selected from the group consisting of one or more of polyethylene terephthalate (otherwise known as PET or polyester), polypropylene, polyvinylchloride (PVC), polyolefin, plastics film, polythene, pallet wrap and stretch wrap films, a paper substrate, and a metal foil which is optionally selected from an aluminium or alloy. Preferably, the printing layer is metalised.

In an embodiment, the printing layer is selected from one or more of polyethylene terephthalate (otherwise known as PET or polyester), polypropylene, polyvinylchloride (PVC), polyolefin, plastics film, polythene, pallet wrap and stretch wrap films, which is optionally metalised and preferably the thickness of the printing layer is between about 12 µm and about 50 µm. More preferably, it is about 20 µm to about 40 µm. Most preferably, it is about 30 µm.

In an alternative embodiment, the printing layer is selected from one or more of a paper substrate, which is optionally metalised, and preferably the thickness of the printing layer is up to about 120 µm. More preferably, it is about 90 µm to about 120 µm.

In an alternative embodiment, the printing layer is selected from one or more of a metal foil which is optionally selected from an aluminium or alloy, and preferably the thickness for the printing layer is from about 9 µm to about 15 µm. More preferably, it is about 10 µm to about 14 µm. Most preferably, it is about 12 µm.

Preferably, the cover layer is transparent. More preferably, it is colourless. Preferably the thickness of this layer is between about 12 µm and about 30 µm. More preferably, it is about 15 µm to about 25 µm. Most preferably, it is about 20 µm.

Preferably, the cover layer is of a flexible material. Preferably, it is selected from the group consisting of polyethylene terephthalate (otherwise known as PET or polyester), polypropylene, PVC, polyolefin, plastics Film, polythene, pallet wrap and stretch wrap films.

The resulting heat seal film will give the appearance of a film printed on both sides of the printing layer, encapsulated between the sealing layer and the cover layer, both of which are preferably transparent.

In a third aspect, the invention provides a heat seal film wherein the film comprises a laminate having a sealing layer and a printing layer, wherein the sealing layer has first and second surfaces, and the printing layer has first and second surfaces, the first surface of the sealing layer is printed and adjoins the second surface of the printing layer.

Preferably, the first surface of the printing layer is printed.

Preferably, the laminate further comprises a cover layer which adjoins the first surface of the printing layer.

Preferably, the sealing layer is transparent. More preferably, it is colourless. Preferably the thickness of this layer is between about 20 µm and about 150 µm. More preferably, it is about 50 µm to about 100 µm. Most preferably, it is about 75 µm.

Preferably, the sealing layer is of a flexible material. Preferably, it is selected from the group consisting of polyethylene terephthalate (otherwise known as PET or polyester), polypropylene, PVC, polyolefin, plastics Film, polythene, pallet wrap and stretch wrap films.

Preferably, the printing layer is opaque. In an embodiment the printing layer is selected from one or more of substantially white, substantially metalised and substantially multi-coloured coloured.

Preferably, the printing layer is of a flexible material. Preferably, it is selected from the group consisting of one or more of polyethylene terephthalate (otherwise known as PET or polyester), polypropylene, polyvinylchloride (PVC), polyolefin, plastics film, polythene, pallet wrap and stretch wrap films, a paper substrate, and a metal foil which is optionally selected from an aluminium or alloy. Preferably, the printing layer is metalised.

In an embodiment, the printing layer is selected from one or more of polyethylene terephthalate (otherwise known as PET or polyester), polypropylene, polyvinylchloride (PVC), polyolefin, plastics film, polythene, pallet wrap and stretch wrap films, which is optionally metalised and preferably the thickness of the printing layer is between about 12 µm and about 50 µm. More preferably, it is about 20 µm to about 40 µm. Most preferably, it is about 30 µm.

In an alternative embodiment, the printing layer is selected from one or more of a paper substrate, which is optionally metalised, and preferably the thickness of the printing layer is up to about 120 µm. More preferably, it is about 90 µm to about 120 µm.

In an alternative embodiment, the printing layer is selected from one or more of a metal foil which is optionally selected from an aluminium or alloy, and preferably the thickness of the printing layer is from about 9 µm to about 15 µm. More preferably, it is about 10 µm to about 14 µm. Most preferably, it is about 12 µm.

Preferably, the cover layer is transparent. More preferably, it is colourless. Preferably the thickness of this layer is between about 12 µm and about 30 µm. More preferably, it is about 15 µm to about 25 µm. Most preferably, it is about 20 µm.

Preferably, the cover layer is of a flexible material. Preferably, it is selected from the group consisting of polyethylene terephthalate (otherwise known as PET or polyester), polypropylene, PVC, polyolefin, plastics Film, polythene, pallet wrap and stretch wrap films.

In a fourth aspect, the invention provides a pack comprising a heat seal film according to the invention.

In one preferred embodiment the heat seal film comprises a sealing layer and printing layer. In this the cover layer is omitted. In an alternative preferred embodiment, the heat seal film comprises a laminate of a sealing layer, a printing layer and a cover layer.

As a consequence of printing onto the surface of the sealing layer, it is not required to print on both sides of the printing layer. As a result, two passes through the printing press to print on both sides of the printing layer are not required.

In addition, because the sealing layer and the printing layer are laminated together at the time of printing, it enables the printing of a first design and a second design during a single pass through the printing press. This means that the first design and the second design can be printed in register to each other (i.e. the design on one side of the film matches up to the design on the other side of the film). This is important because when the film is sealed to a blister pack or tray, the designs on each side of the heat seal film must be positioned correctly relative to the tray.

In the case that printing on the sealing layer and the printing layer were printed independently in separate print passes, it would be difficult to laminate them together as a separate process and still retain the films precisely in register to each other.

Furthermore, if the printing layer is turned 180 degrees during the print process to enable two side printing within a single pass, this would be difficult to achieve using a heat seal film because the film would be liable to creasing or scratching. This problem is addressed by the invention because none of the individual layers received by the printing press require turning so that they can be printed on both sides during the print process.

BRIEF DESCRIPTION OF THE DRAWINGS

The invention will now be described in detail by reference to the accompanying drawings in which.

DETAILED DESCRIPTION OF THE INVENTION

It will be appreciated that aspects, embodiments and preferred features of the invention have been described herein in a way that allows the specification to be written in a clear and concise way. However, unless circumstances clearly dictate otherwise, aspects, embodiments and preferred features can be variously combined or separated in accordance with the invention. In a preferred embodiment, a device in accordance with the invention comprises all aspects of the invention.

Within the context of this specification, the word "about" means preferably plus or minus 20%, more preferably plus or minus 10%, even more preferably plus or minus 5%, most preferably plus or minus 2%.

Within the context of this specification, the word "comprises" means "includes, among other things" and should not be construed to mean "consists of only".

Within the context of this specification, the word "substantially" means preferably at least 90%, more preferably 95%, even more preferably 98%, most preferably 99%.

A printing press has been invented to feed multiple layers into the press at the same time and to laminate these materials together during the printing process.

Figure 1:
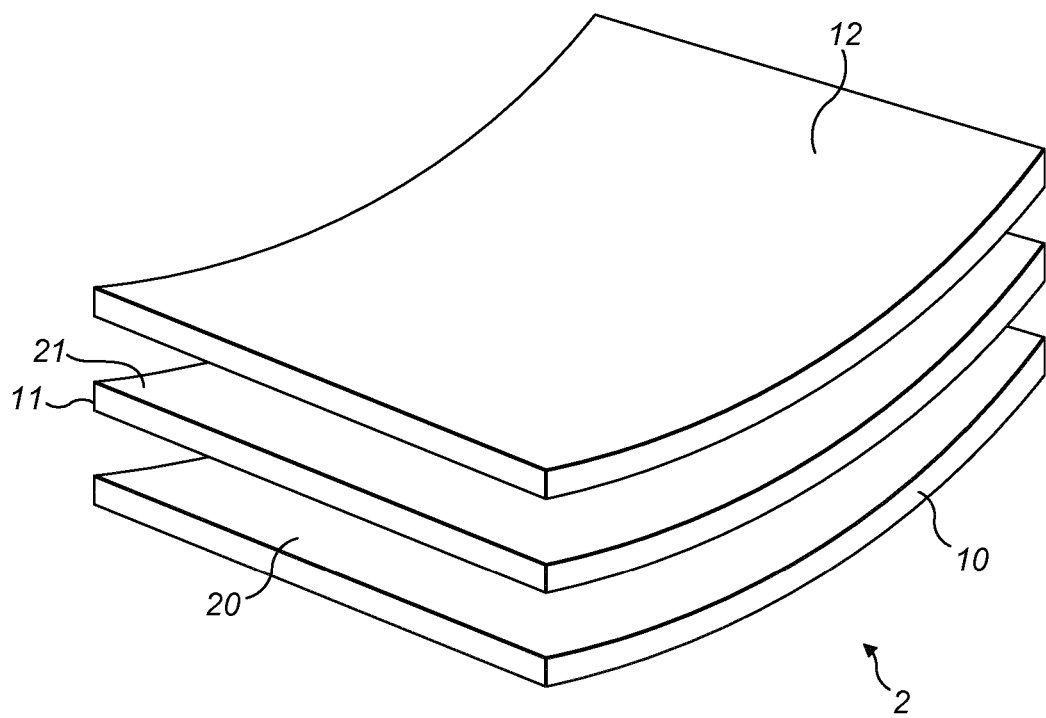
FIG. 1 shows an exploded view of a heat seal film. Films of the kind shown are used to seal many types of pack.
Figure 2:
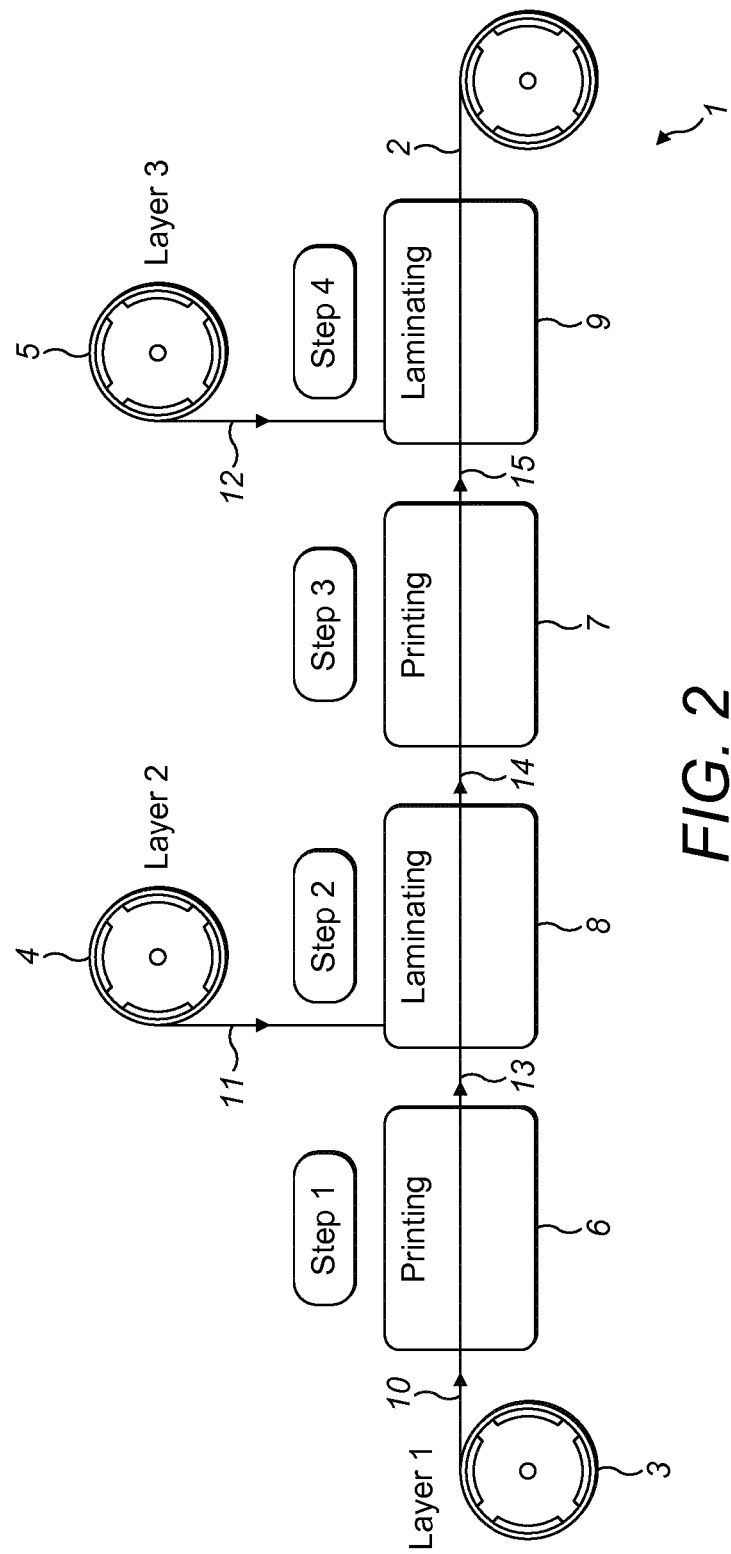
FIG. 2 shows a view of the steps in a method according to the invention.

With reference to FIGS. 1 and 2, the invention provides a printing press (1) for printing a heat seal film (2) for packaging, wherein the press comprises three receivers (3) (4) (5), a first printer (6), a second printer (7), a first laminator (8) and a second laminator (9), wherein, in use, a first receiver (3) is capable of receiving a colourless sealing layer (10) and a second receiver (4) is capable of receiving an opaque printing layer (11) and a third receiver (5) is capable of receiving a colourless cover layer (12).

The first printer (6) prints onto the sealing layer (10) to provide a printed sealing layer (13) and simultaneously the first laminator laminates the printed sealing layer (13) together with the printing layer (11) to provide a laminate (14) of the printed sealing layer (13) and the printing layer (11). In this regard, laminating of a previously printed part of the sealing layer (10) is also taking place downstream of the printing at the same time.

The sealing layer (10) is colourless and it has a thickness of about 75 µm.

The printing layer (11) is opaque and it has a thickness of about 30 µm.

The second printer (7) prints onto a surface (21) of the printing layer (11) facing away from the sealing layer (10) to provide laminate (15) having a printed printing layer (11).

The printed surface (20) of the printed sealing layer (13) adjoins a non-printed surface of the printing layer (11) and the printed surface (21) of the printing layer (11) faces away from the sealing layer (13) so that the laminated heat seal film (2) appears to be printed on opposing sides.

The second laminator (9) laminates a colourless cover layer (12) onto the printed surface (21) of the printing layer (11).

The cover layer (12) is colourless and it has a thickness of about 20 μm.

The printing press (1) is capable of providing a laminated heat seal film (2) which will give the appearance of a film printed on both sides of the printing layer (11), encapsulated between the sealing layer (10) and the cover layer (12), both of which are transparent. In this regard, the film (2) comprises a laminate of a sealing layer (10), a printing layer (11) and a cover layer (12), wherein the sealing layer (10) has first and second surfaces, and the printing layer (11) has first (21) and second surfaces, the first surface (20) of the sealing layer (10) is printed and adjoins the second surface of the printing layer (11).

The first surface (21) of the printing layer (11) is also printed and it is adjoined by the cover layer (12).

The laminated heat seal film (2) provided by the printing process can be used to seal a pack, for example a blister pack or a tray.

Each layer of the laminated heat seal film (2) is of a flexible material. Preferably, it is selected from the group consisting of polyethylene terephthalate (otherwise known as PET or polyester), polypropylene, PVC, polyolefin, plastics Film, polythene, pallet wrap and stretch wrap films.

The above described embodiments have been given by way of example only, and the skilled reader will naturally appreciate that many variations could be made thereto without departing from the scope of the invention.

The invention claimed is:

1. A printing press for printing a heat seal film for packaging, comprising at least two receivers, a first printer and a laminator, wherein, in use, a first receiver is capable of receiving a sealing layer and a second receiver is capable of receiving a printing layer, wherein the printer prints onto the sealing layer to provide a printed sealing layer and then the laminator laminates the printed sealing layer together with the printing layer.

2. A printing press according to claim 1, further comprising a second printer, wherein, in use, the second printer prints onto the printing layer to provide a printed printing layer.

3. A printing press according to claim 2, wherein a printed surface of the printed sealing layer adjoins a non-printed surface of the printed printing layer and a printed surface of the printed printing layer faces away from the sealing layer so that the laminated heat seal film appears to be printed on opposing sides.

4. A printing press according to claim 3, wherein the printing press laminates the printed sealing layer onto at least one other layer and the printed sealing layer provides a base of a heat seal film.

5. A printing press according to claim 1, wherein the sealing layer is transparent.

6. A printing press according to claim 1, wherein the sealing layer is colourless.

7. A printing press according to claim 1, wherein a thickness of the sealing layer is between about 20 μm and about 150 μm.

8. A printing press according to claim 1, wherein the sealing layer is of a flexible material selected from the group consisting of polyethylene terephthalate (otherwise known as PET or polyester), polypropylene, PVC, polyolefin, plastics Film, polythene, pallet wrap and stretch wrap films.

9. A printing press according to claim 1, wherein the printing layer is opaque.

10. A printing press according to claim 1, wherein the printing layer is selected from one or more of white, metalised and multi-coloured coloured.

11. A printing press according to claim 1, wherein the printing layer is formed of a flexible material.

12. A printing press according to claim 1, wherein the printing layer is selected from the group consisting of one or more of polyethylene terephthalate (otherwise known as PET or polyester), polypropylene, polyvinylchloride (PVC), polyolefin, plastics film, polythene, pallet wrap and stretch wrap films, a paper substrate, and a metal foil selected from an aluminium or alloy, optionally wherein the printing layer is metalised.

13. A printing press according to claim 1, wherein the printing layer is selected from one or more of polyethylene terephthalate (otherwise known as PET or polyester), polypropylene, polyvinylchloride (PVC), polyolefin, plastics film, polythene, pallet wrap and stretch wrap films, which is metalised and a thickness of the printing layer is between about 12 μm and about 50 μm.

14. A printing press according to claim 1, wherein the printing layer is selected from a paper substrate, which is metalised, and a thickness of the printing layer is up to about 120 μm.

15. A printing press according to claim 1, wherein the printing layer is selected from a metal foil which is selected from aluminium or alloy, and a thickness of the printing layer is between about 9 μm to about 15 μm.

16. A printing press according to claim 1, further comprising a third receiver for receiving a cover layer and a second laminator, wherein, in use, the printing press laminates the cover layer together with the printed sealing layer and the printed printing layer to provide a laminate wherein the cover layer is provided on the printed surface of the printing layer so that the printed printing layer is sandwiched between the printed sealing layer and the cover layer.

17. A printing press according to claim 16, wherein the cover layer is transparent.

18. A printing press according to claim 16, wherein the cover layer is colourless.

19. A printing press according to claim 16, wherein a thickness of the cover layer is between about 12 μm and about 30 μm.

20. A printing press according to claim 16, wherein the cover layer is formed of a flexible material selected from the group consisting of polyethylene terephthalate (otherwise known as PET or polyester), polypropylene, PVC, polyolefin, plastics Film, polythene, pallet wrap and stretch wrap films.

21. A method for printing a heat seal film for packaging, wherein the method comprises the steps of providing a sealing layer and a printing layer, printing onto a first surface of the sealing layer to provide a printed sealing layer and then laminating the printing layer onto the first surface of the sealing layer.

22. The method of claim 21, further comprising the step of printing onto a surface of the printing layer facing away from the sealing layer.

23. The method of claim 22, further comprising the step of laminating a cover layer onto the printed surface of the printing layer.

24. The method of claim 21, wherein the sealing layer is transparent.

25. The method of claim 21, wherein the sealing layer is colourless.

26. The method of claim 21, wherein the sealing layer is between about 20 µm and about 150 µm.

27. The method of claim 21, wherein the sealing layer is formed of a flexible material, selected from the group consisting of polyethylene terephthalate (otherwise known as PET or polyester), polypropylene, PVC, polyolefin, plastics Film, polythene, pallet wrap and stretch wrap films.

28. The method of claim 21, wherein the printing layer is opaque.

29. The method of claim 21, wherein the printing layer is selected from one or more of substantially white, substantially metalised and substantially multi-coloured coloured.

30. The method of claim 21, wherein the printing layer is formed of a flexible material.

31. The method of claim 21, wherein the printing layer is selected from the group consisting of one or more of polyethylene terephthalate (otherwise known as PET or polyester), polypropylene, polyvinylchloride (PVC), polyolefin, plastics film, polythene, pallet wrap and stretch wrap films, a paper substrate, and a metal foil which is selected from an aluminium or alloy, and wherein the printing layer is metalised.

32. The method of claim 21 wherein the printing layer is selected from one or more of polyethylene terephthalate (otherwise known as PET or polyester), polypropylene, polyvinylchloride (PVC), polyolefin, plastics film, polythene, pallet wrap and stretch wrap films, which is metalised and a thickness of the printing layer is between about 12 µm and about 50 µm.

33. The method of claim 21 wherein the printing layer is selected from a paper substrate, which is metalised, and a thickness of the printing layer is up to about 120 µm.

34. The method of claim 21 wherein the printing layer is selected from a metal foil which is selected from aluminium or alloy, and a thickness of the printing layer is from about 9 µm to about 15 µm.

35. The method claim 23, wherein the cover layer is transparent.

36. The method of claim 23, wherein the cover layer is colourless.

37. The method of claim 23, wherein the thickness of the cover layer is between about 12 µm and about 30 µm.

38. The method of claim 23, wherein the cover layer is formed of a flexible material selected from the group consisting of polyethylene terephthalate (otherwise known as PET or polyester), polypropylene, PVC, polyolefin, plastics Film, polythene, pallet wrap and stretch wrap films.

39. A heat seal film, comprising a laminate having a sealing layer and a printing layer, wherein the sealing layer has first and second surfaces, and the printing layer has first and second surfaces, the first surface of the sealing layer is printed and adjoins the second surface of the printing layer.

40. A heat seal film according to claim 39, wherein the first surface of the printing layer is printed.

41. A heat seal film according to claim 39, wherein the laminate further comprises a cover layer which adjoins the first surface of the printing layer.

42. A heat seal film according to claim 39, wherein the sealing layer is transparent.

43. A heat seal film according to claim 39, wherein the sealing layer is colourless.

44. A heat seal film according to claim 39, wherein the sealing layer is between about 20 µm and about 150 µm.

45. A heat seal film according to claim 39, wherein the sealing layer is formed of a flexible material, selected from the group consisting of polyethylene terephthalate (otherwise known as PET or polyester), polypropylene, PVC, polyolefin, plastics Film, polythene, pallet wrap and stretch wrap films.

46. A heat seal film according to claim 39, wherein the printing layer is opaque.

47. A heat seal film according to claim 39, wherein the printing layer is selected from one or more of substantially white, substantially metalised and substantially multi-coloured coloured.

48. A heat seal film according to claim 39, wherein the printing layer is formed of a flexible material.

49. A heat seal film according to claim 39, wherein the printing layer is selected from the group consisting of one or more of polyethylene terephthalate (otherwise known as PET or polyester), polypropylene, polyvinylchloride (PVC), polyolefin, plastics film, polythene, pallet wrap and stretch wrap films, a paper substrate, and a metal foil which is selected from an aluminium or alloy, and wherein the printing layer is metalised.

50. A heat seal film according to claim 39, wherein the printing layer is selected from one or more of polyethylene terephthalate (otherwise known as PET or polyester), polypropylene, polyvinylchloride (PVC), polyolefin, plastics film, polythene, pallet wrap and stretch wrap films, which is metalised and a thickness of the printing layer is between about 12 µm and about 50 µm.

51. A heat seal film according to claim 39, wherein the printing layer is selected from a paper substrate, which is metalised, and a thickness of the printing layer is up to about 120 µm.

52. A heat seal film according to claim 39, wherein the printing layer is selected from a metal foil which is selected from aluminium or alloy, and a thickness of the printing layer is from about 9 µm to about 15 µm.

53. A heat seal film according claim 41, wherein the cover layer is transparent.

54. A heat seal film according to claim 41, wherein the cover layer is colourless.

55. A heat seal film according to claim 41, wherein a thickness of the cover layer is between about 12 µm and about 30 µm.

56. A heat seal film according to claim 41, wherein the cover layer is formed of a flexible material selected from the group consisting of polyethylene terephthalate, polypropylene, PVC, polyolefin, plastics Film, polythene, pallet wrap and stretch wrap films.

* * * * *